March 31, 1964     P. J. M. T. ALLARD     3,127,038
SHOVELLING AND LOADING MACHINE
Original Filed May 21, 1957     2 Sheets-Sheet 2
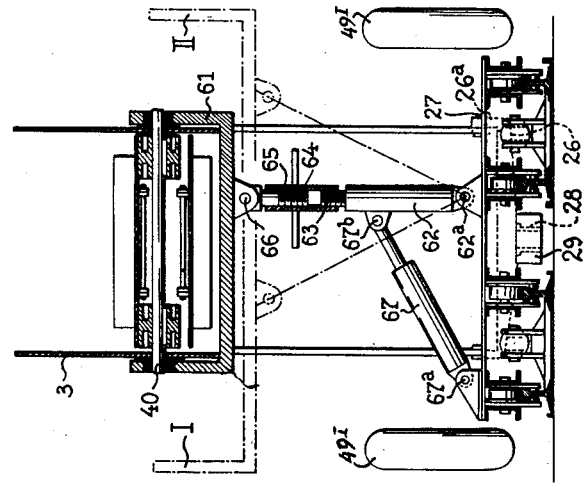
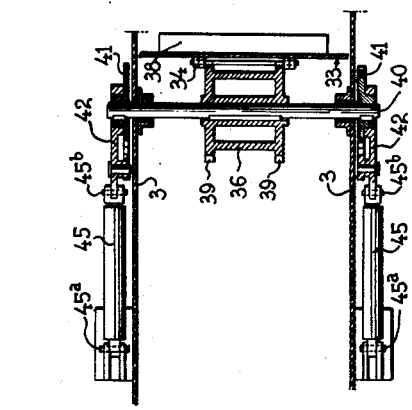
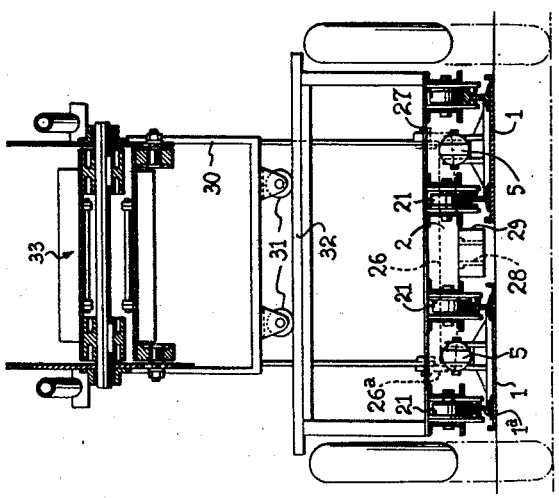
PIERRE JEAN MARIE THEODORE ALLARD
by E. M. Squire
his attorney

United States Patent Office 3,127,038
Patented Mar. 31, 1964

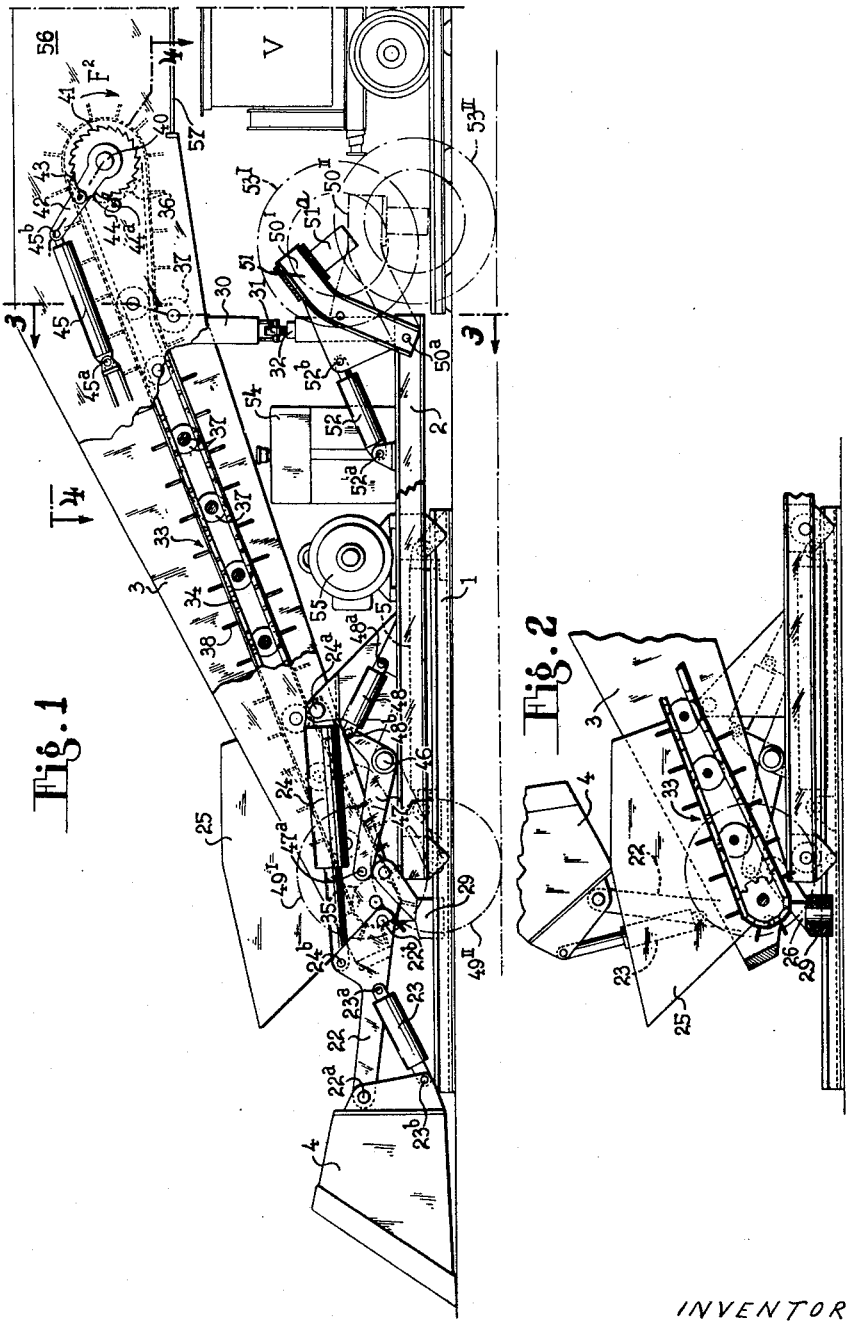

3,127,038
SHOVELLING AND LOADING MACHINE
Pierre Jean Marie Theodore Allard, 8 Ave. de Soisy,
Eaubonne, France
Original application May 21, 1957, Ser. No. 660,562.
Divided and this application Nov. 27, 1959, Ser. No.
855,935
Claims priority, application France May 23, 1956
7 Claims. (Cl. 214—90)

The present invention relates to a mobile shoveling and loading machine mounted on highway wheels which may be raised or lowered at will.

This application is a division of my copending application, Serial No. 660,562, filed May 21, 1957 and now abandoned.

The machine comprises hydraulically actuated skid or rail means for positively advancing the shovel into material to be loaded or for turning the entire machine about a vertical axis with the highway wheels raised so that the skids may engage the ground. The skids may advance freely with the highway wheels lowered.

The machine comprises an inclined endless belt conveyor into the lower end of which the shovel unloads. The conveyor lifts the shovelled material to a discharge position from which it may be dumped directly into trucks or similar vehicles. The conveyor is disposed in a passageway which permits the accumulation of shoveled material during intervals when there is no vehicle ready to be loaded. The conveyor is ratchet operated by hydraulic jacks which facilitates its intermittent operation.

Means are provided for displacing the upper end of the conveyor laterally without moving the rest of the machine. This facilitates distribution of the load within a particular vehicle.

The invention will be better understood from the following specification together with the accompanying drawing forming a part thereof.

Referring to the drawing:

FIGURE 1 is a side elevational view of a shovel loader embodying the invention with the shovel in its shovelling position, the machine being partly broken away and shown in section to illustrate details of construction.

FIGURE 2 is a fragmentary view in longitudinal section of the machine of FIG. 1 showing the shovel in its unloading position.

FIGURE 3 is a rear sectional view taken along the line 3—3 of FIG. 1.

FIGURE 4 is a plan sectional view taken along the line 4—4 of FIG. 1.

FIGURE 5 is a rear sectional view similar to FIG. 3 showing a modified form of the device for producing lateral displacement of the upper end of the conveyor.

Referring to FIGS. 1 and 3, the machine comprises a chassis 2 which is supported, in its shovelling position, on skid means formed by support pads 1 of the type described in my U.S. Patent application Serial No. 527,010 filed August 8, 1955, now Patent No. 2,914,127. Each of these pads, skid or rail means 1 comprises a rail 1$^a$ (see in particular FIG. 3) along which the chassis 2 rolls through the medium of rollers 21. These rails are suspended from the chassis and are movable longitudinally thereof when the machine is raised on highway wheels in the manner described hereinafter.

The shovelling bucket 4 is pivoted at 22$^a$ to the end of an arm 22 pivoted at its other end at 22$^b$ to the passageway 3. A jack 23, pivoted at 23$^a$ to this arm and at 23$^b$ to the bucket, permits tilting the latter so as to direct it into the material or heap of material to be shovelled at the most suitable angle. The arm 22 can be pivoted about the pivot shaft 22$^b$ by a jack 24 pivoted at 24$^a$ to a bracket 24$^c$ fixed on the chassis 2 and to the arm 22 at a point 24$^b$ intermediate of the ends of this arm. The jack 24 permits raising the bucket 4 and bringing it into the discharge position shown in FIG. 2. A three-sided hopper 25 is fixed to the passageway 3 to receive the contents of the bucket.

The passageway rests at its forward or lower part on a support 26 (FIG. 3) having eyes 26$^a$ and pins 27, this support 26 being pivotably mounted on the chassis 2 by means of a vertical pivot member 28 rotatable in a sleeve 29 rigid with the chassis 2. The passageway 3 is supported at its upper or rear end by a U-shaped member 30 which is capable of rolling along an arcuate runway 32 through the medium of rollers 31, 31, the runway 32 being fixedly supported by the chassis 2. This arrangement permits positioning the upper or discharge end of the passageway vertically directly above the vehicle to be loaded, hydraulic jacks or other suitable means (not shown) being provided for moving the discharge end of the passageway 3 laterally with respect to the chassis 2 along the runway 32. This lateral movement facilitates correct distribution of the load within the vehicle V during loading.

The bottom or base of the passageway consists of an endless conveyor belt designated generally as 33 formed of articulated blocks or links, such as links 34, which at the forward end of the machine pass around a drum 35 and at the rear end pass around a sprocket wheel 36. This conveyor chain or belt is supported by rollers, such as rollers 37, and some of the links 34 are provided with a vertical flange or blade 38 for preventing longitudinal movement of the material being handled along the conveyor belt 33. The distance between each of these blades and their height are chosen to suit the nature of the material to be conveyed.

The sprocket wheel 36 has teeth 39 (FIG. 4) which engage with the lower part of the links 34 of the conveyor 33 so as to move the latter. The sprocket wheel may be driven to advance the conveyor 33 by driving means which will now be described.

This sprocket wheel 36 is keyed to a shaft 40 which is journalled in members forming the side walls of the passageway. Keyed on each end of this shaft is a ratchet wheel 41, and freely rotatable on the hub of each ratchet wheel is a lever 42 to which is pivoted a pawl 43 engaged with the corresponding ratchet wheel 41. This pawl 43 is held in contact with the wheel 41 by its own weight or by resiliently yieldable means such as a spring (not shown). A retaining pawl 44 is pivotably mounted on a pin 44$^a$ rigid with the passageway.

The ratchet wheel and the pawls are so arranged that the shaft 40 is rotated when the lever 42 rotates in the direction of arrow F$^2$, but remains stationary when the lever turns in the opposite direction, the pawl 44 preventing reverse rotation of the sprocket wheel and corresponding reverse movement of the conveyor belt 33.

Each of the levers 42 is moved by a jack 45 pivoted at 45$^a$ to the passageway and at 45$^b$ to the end of the lever 42.

The machine may be raised by means of the following device, which is an improvement over the devices described in said patent. Pivotably mounted on a shaft 46 rigid with the chassis is a bell crank 47 the small arm of which is pivoted at 48$^b$ to a jack 48 pivoted at 48$^a$ to a member rigid with the chassis. The other arm of the bell crank 47 carries at its end at 47$^a$ a highway wheel 49 which, owing to the action of the jack 48, may assume a raised position 49$^I$, in which position the support pads 1 lie on the ground, or a lowered position 49$^{II}$ in which the machine is raised and the support pads 1 are capable of moving relative to the chassis 2 while the chassis 2 remains stationary.

Pivoted to the rear part of the chassis 2 at 50$^a$ is a member 50 carrying a pivot member 51. A jack 52 is pivoted at 52ᵃ to the chassis and at 52ᵇ to the member 50, which latter is capable of assuming a raised position shown in full line at 50ᴵ and a lowered position 50ᴵᴵ shown in dot-dash line (FIG. 2). Pivotably mounted on the pivot member 51 is an axle 51ᵃ carrying highway wheels 53 on which the rear part of the machine bears. The assemblage of the wheels 49 and the rear axle pivoted to the chassis 2 at 51 supports the machine at three points, thereby avoiding any twisting of the chassis.

The wheels 53 can assume raised or lowered positions 53ᴵ or 53ᴵᴵ, respectively, and may, if desired, act as steering wheels, in particular when travelling long distances. The axle 51ᵃ may receive a coupling device permitting the machine to be towed. The axle may also be arranged in the form of a driving axle which permits self-propulsion of the machine.

The machine also comprises a unit arranged to supply oil to the various jacks of the machine, this unit consisting, for example, of a pump 54 driven by an electric motor 55. Distributors or valves of known type (not shown) are also provided for controlling the flow of oil to the jacks manually or automatically in accordance with a given program.

A hopper 56 may be provided at the rear of the machine comprising a movable bottom door 57.

The machine operates in the following manner:

Let it be assumed that the machine rests on the ground through the medium of its support pads or rail means 1, that the latter are in their forwardly extending position as shown in FIG. 1, and that the chassis is in its rear position relative to the support pads. Upon actuation of the jacks 5, the chassis, and in consequence the bucket 4, are moved forwardly so that the latter is urged into the material to be shovelled or removed and the combination of the operation of the jack 23 with that of the jacks 5 facilitates this shovelling operation. When the bucket is full, the jack 24 and the jack 23 are actuated and the filled bucket 4 pivots about the shaft 22ᵃ and revolves about the shaft 22ᵇ and assumes the position shown in FIG. 2, whereupon the material contained therein is dumped into the hopper 25 and onto the conveyor 33.

The jacks 45 are then actuated and they drive, through the medium of the ratchet wheels 41, the sprocket wheel 36 which advances the conveyor a distance which is variable and adjustable in accordance with the period during which these jacks are supplied with oil.

The shovelling operation is effected as many times as necessary with a corresponding displacement of the conveyor. Thus, the machine may accumulate a large amount of shovelled material on the conveyor belt 33 within the passageway prior to the loading of a particular vehicle V.

The oil flow from the hydraulic pressure source 54 is so arranged as to obtain a continuous movement of the conveyor, the jacks 45 operating alternately to drive the conveyor, one of these jacks urging one lever 42 in the direction of arrow F² while the other is effecting its inoperative return travel.

When a vehicle V is in its loading position, the oil supply device for the jacks 45 is arranged to operate continuously, so as to obtain a continuous movement of the conveyor and the bottom door 57 is opened. Thus, it is possible to unload into the vehicle or vehicles V in succession the contents of the hopper 56 and the stock of material in the passageway.

It will be observed that in order to move the machine toward the material or heap of material to be shovelled, the device causing a stage by stage advance of the machine may be used by raising the forward part of the machine on the wheels 49 by means of the jack 48 and raising the rear of the machine on the wheels 53 by means of the jack 52. The support pads 1 are then moved forwardly with the chassis 2 stationary on the highway wheels 49, 53. Thereafter, the machine is lowered onto the ground and rolled forwardly along the rails 1ᵃ of the support pads by actuating the jacks 5. When the machine rests on the highway wheels 49 and 53, it may be transported long distances and in particular along roads. The machine may also be moved on the highway wheels in any direction to which it may be turned by displacement of pad members 1 simultaneously in opposite directions as described below. It will be understood that some of the devices and members described and shown may be replaced by a pair of identical devices or members disposed symmetrically relative to the longitudinal axis of the machine.

The machine may also be turned without appreciable movement, either forward or backward. With the highway wheels 49 and 53 lowered, the support pads 1 are moved in opposite directions, one forwardly and the other rearwardly. The highway wheels are then raised, lowering the machine so that it is supported on the pads 1. By actuation of the jacks 5 simultaneously in opposite directions to move the machine forwardly on the forwardly displaced pad 1 and rearwardly on the rearwardly displaced pad 1, the entire machine may be turned on the support pads 1 about a vertical axis without appreciable forward or rearward movement.

FIG. 5 shows a modification of the device for swinging the passageway 3 laterally about the pivot member 28. In this modification the passageway is supported by a U-shaped member 61 pivotably mounted on the shaft 40 carrying the sprocket wheel 36 of the conveyor. This U-shaped member 61 is supported by a post 62 pivoted to the chassis at 62ᵃ. This post is provided with a screw-threaded male portion 63 which is engaged with a sleeve 64 having two oppositely tapped portions. The tapped portion of the sleeve 64 above the tapped portion engaged with the portion 63 is engaged with a screw-threaded shaft 65 pivoted at 66 to the member 61. A jack 67 is pivoted at 67ᵃ to the chassis 2 and at 67ᵇ to the post 62 and permits pivoting the latter about the pivot pin 62ᵃ and thus permits varying the orientation of the passageway 3 relative to the chassis between the two extreme positions I and II shown in dot-dash line in FIG. 5.

It will be understood that the pivot connections 67ᵃ and 67ᵇ have a sufficient range of angular displacement to permit the swinging movement of the passageway 3 laterally about the axis of the pivot member 28. The tapped sleeve 64 permits a manual adjustment of the inclination of the passageway and in consequence of the material-unloading or delivery height of the machine.

I have shown and described what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. A shovel loader comprising: a group of selectively raisable and lowerable highway wheels; an elongated chassis including a plurality of laterally spaced separately longitudinally reciprocable skid means simultaneously engageable with the ground when the highway wheels are raised and free of the ground when the highway wheels are lowered, said chassis being supported by said skid means when said wheels are raised and by said wheels when said wheels are lowered; a shovel member carried by said chassis and which may be raised and lowered at will; conveyor means having an inlet and an outlet, said shovel member being movable to discharge its contents into said conveyor inlet, the outlet of said conveyor being disposed to discharge said contents into receiving means for loading the same; a source of pressure fluid; means controllably actuated by said source of pressure fluid for causing discharging movement of said shovel, and further means controllably actuable by said source for selectively displacing all of said skid means simultaneously in one direction relative to said chassis with said wheels raised to advance said shovel into material to be loaded or in the opposite direction with said wheels lowered for advancing said skid means, at least two separate ones of said skid means being selectively displaceable simultaneously in opposite directions by said further means with said wheels raised for rotating said chassis about a vertical axis.

2. A shovel loader according to claim 1, wherein said conveyor means comprises an endless belt which is loaded by said shovel means with the contents thereof and discharges said contents into said receiving means; means for preventing longitudinal movement of said contents along said belt; a ratchet wheel connected to drive said belt; reciprocable pawl means cooperating with said ratchet wheel to drive said belt forwardly; hydraulic means connected to said source of pressure fluid for reciprocating said pawl means; and means for preventing reverse movement of said belt.

3. A shovel loader comprising, in combination: an elongated chassis; a plurality of laterally spaced rail means depending from said chassis, said rail means extending longitudinally slidably with respect to said chassis and being engageable with the ground for longitudinally movably supporting said chassis thereon; a plurality of first power operated means each individually connected to one of said rail means and to said chassis for selectively producing relative longitudinal displacement in either direction between said one of said rail means and said chassis, whereby said chassis may be selectively advanced or rotated about a vertical axis; an elongated inclined chute supported by said chassis and extended longitudinally thereof; means connecting one end portion of said chute to said chassis at a fixed height appropriate for discharging material from said chute into a vehicle to be loaded; shovel means pivotally connected to the other end portion of said chute, said shovel means being located below said one end portion of said chute; second power operated means connected to displace said shovel means selectively between a shoveling position for shoveling material to be loaded and a dumping position for discharging shoveled material from said shovel means into said other end portion of said chute; conveyor means extending longitudinally of said chute between said end portions thereof; third power operated means connected to drive said conveyor means for transporting material from said other end portion of said chute to said one end portion thereof; a set of raisable and lowerable highway wheels connected to said chassis; and fourth power operated means connected to raise and lower said highway wheels to bring the ground engaging portions thereof selectively above or below the ground engaging portions of said rail means.

4. A shovel loader according to claim 3, wherein said plurality of first power operated means comprises two separate hydraulic jacks symmetrically disposed at opposite sides of the longitudinal axis of said chassis.

5. A shovel loader comprising, in combination: an elongated chassis; rail means depending from said chassis, said rail means extending longitudinally slidably with respect to said chassis and being engageable with the ground for longitudinally movably supporting said chassis thereon; a first power operated means connected between said rail means and said chassis for selectively producing relative longitudinal displacement in either direction between said rail means and said chassis; an elongated inclined chute supported by said chassis and extending longitudinally thereof; means connecting one end portion of said chute to said chassis at a fixed height appropriate for discharging material from said chute into a vehicle to be loaded, said last-named means including means permitting lateral movement of said one end portion of said chute relative to the other end portion thereof; shovel means pivotally connected to the other end portion of said chute, said shovel means being located below said one end portion of said chute, said other end portion of said chute being pivotally connected to said chassis for permitting said lateral movement of said one end portion; second power operated means connected to displace said shovel means selectively between a shoveling position for shoveling material to be loaded and a dumping position for discharging shoveled material from said shovel means into said other end portion of said chute; conveyor means extending longitudinally of said chute between said end portions thereof; third power operated means connected to drive said conveyor means for transporting material from said other end portion of said chute to said one end portion thereof; a set of raisable and lowerable highway wheels connected to said chassis; and fourth power operated means connected to raise and lower said highway wheels to bring the ground engaging portions thereof selectively above or below the ground engaging portions of said rail means.

6. A shovel loader according to claim 5, wherein said means connecting said one end portion of said chute to said chassis comprises a horizontal arcuate track concentric with said pivotal connection of said other end portion to said chassis.

7. A shovel loader according to claim 5, wherein said means connecting said one end portion of said chute to said chassis comprises a normally upright member; said loader further comprising means included in said upright member for adjusting the length thereof; means pivotally interconnecting the upper end portion of said upright member and said one end portion of said chute; means pivotally interconnecting the lower end portion of said upright member and said chassis; and fifth power operated means connected to said upright member for displacing said upright member to produce said lateral movement of said one portion of said chute.

References Cited in the file of this patent

UNITED STATES PATENTS

| | | |
|---|---|---|
| 1,364,903 | Thomas | Jan. 11, 1921 |
| 1,470,221 | Freeman | Oct. 9, 1923 |
| 1,877,286 | Farnham | Sept. 13, 1932 |
| 2,762,631 | Entz | Sept. 11, 1956 |
| 2,826,402 | Alspaugh et al. | Mar. 11, 1958 |